(12) United States Patent
Koda et al.

(10) Patent No.: US 8,502,986 B2
(45) Date of Patent: Aug. 6, 2013

(54) LIGHTWAVE INTERFERENCE MEASUREMENT APPARATUS THAT CALCULATES ABSOLUTE DISTANCE USING LIGHTWAVE INTERFERENCE

(75) Inventors: Yusuke Koda, Utsunomiya (JP); Yoshiyuki Kuramoto, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 297 days.

(21) Appl. No.: 13/037,849

(22) Filed: Mar. 1, 2011

(65) Prior Publication Data

US 2011/0211198 A1    Sep. 1, 2011

(30) Foreign Application Priority Data

Mar. 1, 2010  (JP) .................................. 2010-043690

(51) Int. Cl.
*G01B 9/02*        (2006.01)
(52) U.S. Cl.
USPC ......................................................... 356/486
(58) Field of Classification Search
USPC ................................. 356/485–487, 493, 498
See application file for complete search history.

(56) References Cited

U.S. PATENT DOCUMENTS 5,631,736 A * 5/1997 Thiel et al. ..................... 356/486
5,784,161 A * 7/1998 Bechstein et al. ............. 356/487
6,943,894 B2 * 9/2005 Kitahara ......................... 356/487
8,289,523 B2 * 10/2012 Le Floch et al. .............. 356/486
8,339,611 B2 * 12/2012 Kuramoto ...................... 356/486

FOREIGN PATENT DOCUMENTS

| JP | 03-285102 A | 12/1991 |
|---|---|---|
| JP | 07-049207 A | 2/1995 |
| JP | 2725434 B2 | 3/1998 |
| JP | 2810956 B2 | 10/1998 |

OTHER PUBLICATIONS

Cabral, Alexandre et al. "Dual freuqency sweeping interferometry with range-invariant accuracy for absolute distance metrology". Interferometry XIV: Techniques and Analysis, Proc. of SPIE vol. 7063, 2008, pp. 70630T-1-70630T-13.*

* cited by examiner

*Primary Examiner* — Michael A Lyons
(74) *Attorney, Agent, or Firm* — Rossi, Kimms & McDowell LLP (57) ABSTRACT

A lightwave interference measurement apparatus includes a wavelength-variable laser which periodically performs wavelength scanning between first and second reference wavelengths to emit light beam, a wavelength-fixed laser which emits light beam having a third reference wavelength, a light beam splitting element which splits the light beams into reference light beam and light beam under test, a phase detector which detects a phase based on an interference signal of the reference light beam and the light beam under test, and an analyzer which sequentially determines an interference order of the third reference wavelength based on the third reference wavelength, first and second synthetic wavelengths, an integer component of a phase change amount in the wavelength scanning, and interference orders of the first and second synthetic wavelengths, and calculates an absolute distance between the surface under test and the reference surface.

8 Claims, 6 Drawing Sheets

LIGHTWAVE INTERFERENCE MEASUREMENT APPARATUS THAT CALCULATES ABSOLUTE DISTANCE USING LIGHTWAVE INTERFERENCE

BACKGROUND OF THE INVENTION

1. Field of the Invention

The present invention relates to a lightwave interference measurement apparatus (interferometer) that measures an absolute distance using lightwave interference.

2. Description of the Related Art

As a conventional lightwave interference measurement apparatus that measures an absolute distance, a wavelength-scanning lightwave interference measurement apparatus is known. Commonly, since the absolute distance measurement by the wavelength scanning is a low accuracy measurement, a method of combining a relative distance measurement by a fixed wavelength with it to improve the accuracy is used. In these method, an accuracy of an amount of wavelength scanning, an accuracy of the fixed wavelength, a phase measurement accuracy at the time of measuring the relative distance are main accuracy factors.

Japanese Patent No. 2725434 discloses an FM heterodyne method that measures a single interference signal intensity to calculate an absolute distance based on the intensity change of the interference signal that is generated by the wavelength scanning. Japanese Patent No. 2810956 discloses a method of introducing a phase measurement by a Lissajous waveform based on two interference signal intensities having phases different by 90 degrees from each other as a method of a highly-accurate absolute distance measurement compared with the FM heterodyne method.

However, in the conventional lightwave interference measurement apparatus, in order to obtain sufficient measurement accuracy by combining the absolute distance measurement and the relative distance measurement, a large amount of wavelength scanning was necessary. There are problems to realize the large amount of wavelength scanning and measure the absolute distance at high speed as follows. When an inexpensive DFB laser is used, the large amount of wavelength scanning can be performed by the wavelength scanning by the temperature modulation, but the wavelength scanning cannot be performed at high speed because of taking much time to follow it. In order to solve the problem, there is an external resonator-type LD or the like that is capable of performing the wavelength scanning at high speed by adjusting the tilt of the grating, but this is expensive. Furthermore, since an interference order cannot be determined when a surface under test (test surface) varies, a complicated process that stabilizes the surface under test was necessary in order to perform the absolute length measurement.

SUMMARY OF THE INVENTION

A lightwave interference measurement apparatus as one aspect of the present invention includes a wavelength-variable laser configured to periodically perform wavelength scanning between a first reference wavelength $\lambda_1$ and a second reference wavelength $\lambda_2$ to emit light beam, a wavelength-fixed laser configured to emit light beam having a third reference wavelength $\lambda_3$, a wavelength reference element configured to be able to set a wavelength of the light beam emitted from the wavelength-variable laser to the first reference wavelength $\lambda_1$ and the second reference wavelength $\lambda_2$, a light beam splitting element configured to split the light beams emitted from the wavelength-variable laser and the wavelength-fixed laser into reference light beam and light beam under test, a reference surface configured to reflect the reference light beam, a surface under test, configured to reflect the light beam under test, a phase detector configured to detect a phase based on an interference signal of the reference light beam that is reflected on the reference surface and the light beam under test that is reflected on the surface under test, and an analyzer configured to sequentially determine an interference order of the third reference wavelength $\lambda_3$ based on the third reference wavelength $\lambda_3$, a first synthetic wavelength $\Lambda_{12}$, a second synthetic wavelength $\Lambda_{13}$, an integer component of a phase change amount in the wavelength scanning, and interference orders of the first synthetic wavelength $\Lambda_{12}$ and the second synthetic wavelength $\Lambda_{12}$, and calculates an absolute distance between the surface under test and the reference surface, where the first synthetic wavelength $\Lambda_{12}$ is represented by $\lambda_1 \cdot \lambda_2 / |\lambda_1 - \lambda_2|$ and the second synthetic wavelength $\Lambda_{13}$ is represented by $\lambda_1 \cdot \lambda_3 / |\lambda_1 - \lambda_3|$.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

First Embodiment

Figure 1:
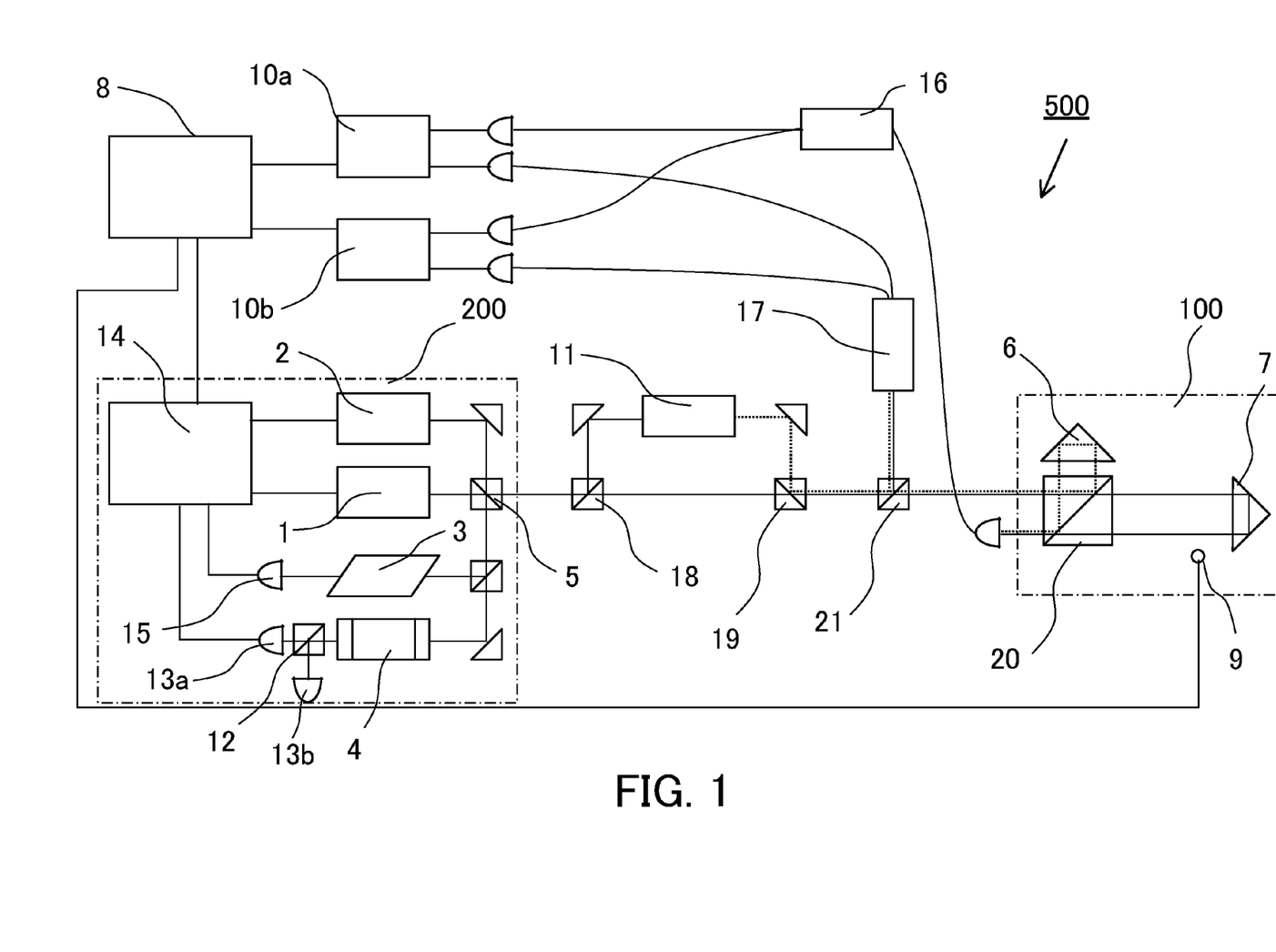
FIG. 1 is a configuration diagram of a lightwave interference measurement apparatus in a first embodiment.

First of all, a lightwave interference measurement apparatus (interferometer) in a first embodiment of the present invention will be described. FIG. 1 is a configuration diagram of a lightwave interference measurement apparatus 500 in the present embodiment. The lightwave interference measurement apparatus 500, as illustrated in FIG. 1, includes a wavelength-variable laser (wavelength-tunable laser) 1 whose wavelengths are periodically scanned and a wavelength-fixed laser 2 whose wavelength is fixed. The wavelength-variable laser 1 periodically performs a wavelength scanning between a first reference wavelength $\lambda_1$ and a second reference wavelength $\lambda_2$ to emit a light beam. The wavelength-fixed laser 2 emits a light beam of a third reference wavelength $\lambda_3$.

The lightwave interference measurement apparatus 500 includes a gas cell 3 as a wavelength reference element, a Fabry-Perot etalon 4 (an etalon) as a wavelength reference element, and a polarizing beam splitter 20 as a light beam splitting element. The wavelength reference element sets the wavelength of the light beam emitted from the wavelength-variable laser 1 to the first reference wavelength $\lambda_1$ and the second reference wavelength $\lambda_2$. The light beam splitting element splits each of the light beams emitted from the first reference wavelength $\lambda_1$ and the second reference wavelength $\lambda_2$ into a reference light beam and a light beam under test.

Additionally, the lightwave interference measurement apparatus 500 includes a reference surface 6, a surface under test (test surface) 7, and a detector of a phase of an interference signal based on an optical path difference between the reference surface 6 and the surface under test 7, i.e. an optical path difference between the reference light beam and the light beam under test. The reference surface 6 and the surface under test 7 are configured to reflect the reference light beam and the light beam under test, respectively. The lightwave interference measurement apparatus 500 also includes an analyzer 8 that calculates an absolute distance between the reference surface 6 and the surface under test 7. The absolute distance between the reference surface 6 and the surface under test 7 is an absolute position of the surface under test 7 with reference to a position of the reference surface 6, and is obtained based on the optical path difference between the reference light beam and the light beam under test. The analyzer 8 sequentially determines an interference order of the third reference wavelength $\lambda_3$ based on the third reference wavelength $\lambda_3$, synthetic wavelengths $\Lambda_{12}$ and $\Lambda_{13}$, an integer component of a phase change amount in the wavelength scanning, and interference orders of the synthetic wavelengths $\Lambda_{12}$ and $\Lambda_{13}$, and calculates the absolute distance between the surface under test 7 and the reference surface 6. The synthetic wavelength $\Lambda_{12}$ (a first synthetic wavelength) is represented by $\lambda_1 \cdot \lambda_2 / |\lambda_1 - \lambda_2|$, and the synthetic wavelength $\Lambda_{13}$ (a second synthetic wavelength) is represented by $\lambda_1 \cdot \lambda_3 / |\lambda_1 - \lambda_3|$.

The lightwave interference measurement apparatus 500 connects the two synthetic wavelengths generated from the wavelength-variable laser 1 whose wavelengths are periodically scanned and the wavelength-fixed laser 2 to be able to determine an interference order. Therefore, an amount of wavelength scanning of the wavelength-variable laser 1 is significantly reduced. Thus, the wavelength scanning by a current modulation of the laser can be performed, and a high-speed absolute length measurement is realized.

Hereinafter, the configuration of the lightwave interference measurement apparatus 500 of the present embodiment will be described in detail. The light beam emitted from the wavelength-variable laser 1 is split by a beam splitter 5. The light beam emitted from the wavelength-fixed laser 2 that has a wavelength different from that of the wavelength-variable laser 1 also enters the beam splitter 5, and the light beam is also split when its ray axis becomes coaxial with reference to that of the wavelength-variable laser 1. One of the light beams split by the beam splitter 5 transmits through the Fabry-Perot etalon 4, and then it is separated by a spectral element 12 into light beams of the wavelength-variable laser 1 and the wavelength-fixed laser 2. The amount of light transmitted through the Fabry-Perot etalon 4 is detected by a detector 13a for the light beam of the wavelength-variable laser 1 and by a detector 13b for the light beam of the wavelength-fixed laser 2.

Furthermore, the emission light beam of the wavelength-fixed laser 2 enters the gas cell 3. In the present embodiment, the same type of DFB laser diode is used as each of the wavelength-variable laser 1 and the wavelength-fixed laser 2. In the present embodiment, although the wavelength-variable laser 1 and the wavelength-fixed laser 2 are provided separately from each other, a plurality of laser diodes may also be integrated as one element similarly to a multiwavelength light source used for an optical communication. In this case, it is advantageous in view of the cost and the size. With regard to the emission light beam of the wavelength-fixed laser 2 after transmitting through the gas cell 3, an amount of transmitted light is detected by a detector 15. In the present embodiment, acethylene is used as the gas cell 3 which is used along with the wavelength-variable laser 1 having a wavelength of near 1.5 μm. There is carbon monoxide, hydrogen cyanide, or the like, as another inclusion gas that is usable in a wavelength range near 1.5 μm. Since each gas has a different wavelength range and different central wavelength accuracy, it may be selected as necessary.

Figure 2A:
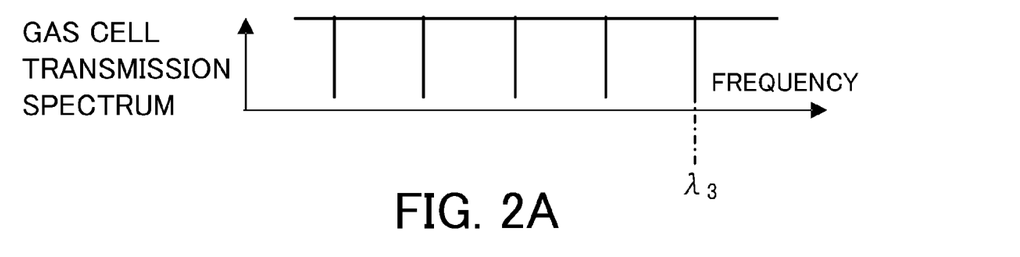
FIGS. 2A to 2C are diagrams illustrating relationships of wavelengths of light sources in a first embodiment.
Figure 2B:
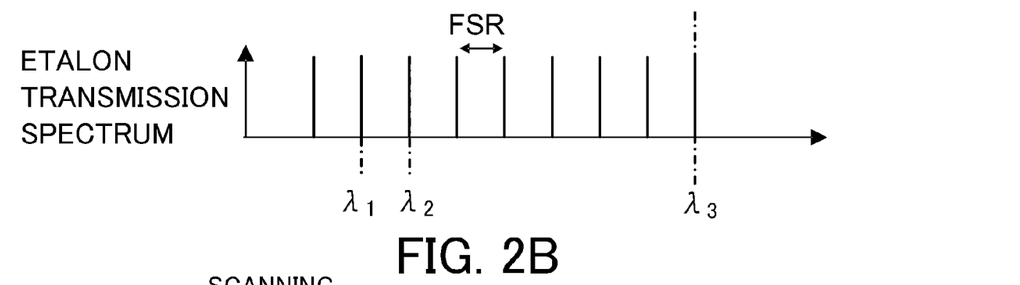
Figure 2C:
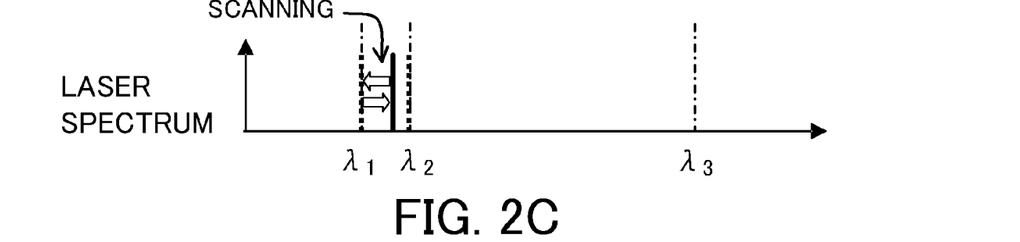

FIG. 2A illustrates a transmission spectrum of the gas cell 3, FIG. 2B illustrates a transmission spectrum of the Fabry-Perot etalon 4, and FIG. 2C illustrates spectra of the wavelength-variable laser 1 and the wavelength-fixed laser 2.

A wavelength control apparatus 14 (a laser control unit) controls the wavelength of the wavelength-fixed laser 2 so as to be stabilized to the third reference wavelength $\lambda_3$ that is an absorption line of the gas cell 3 using a single of the detector 15. At the same time, the wavelength control apparatus 14 controls the optical path length of the Fabry-Perot etalon 4 so that the transmission spectrum of the Fabry-Perot etalon 4 becomes equal to the third reference wavelength $\lambda_3$ using the signal of the detector 13b. In the present embodiment, an absolute value of the wavelength of the transmission spectrum of the Fabry-Perot etalon 4 needs to be guaranteed.

Next, referring to FIGS. 2A to 2C, a wavelength stabilizing control in the first reference wavelength $\lambda_1$ or the second reference wavelength $\lambda_2$ will be described. As illustrated in FIG. 2B, the Fabry-Perot etalon 4 has a periodical transmission property at an equivalent frequency interval FSR, and as described above, the absolute value of its vacuum wavelength is guaranteed. One of the transmission spectra of the Fabry-Perot etalon 4 is used as the first reference wavelength $\lambda_1$. The stabilization of the wavelength is performed by adjusting the wavelength of the wavelength-variable laser 1 by the wavelength control apparatus 14 so that the transmission intensity of the detector 13a becomes constant. When the variation of the amount of incident light (input light power) to the Fabry-Perot etalon 4 is influenced, the amount of incident light is also detected to be corrected. A method of modulating injection current is used as a method of adjusting the wavelength.

Figure 3:
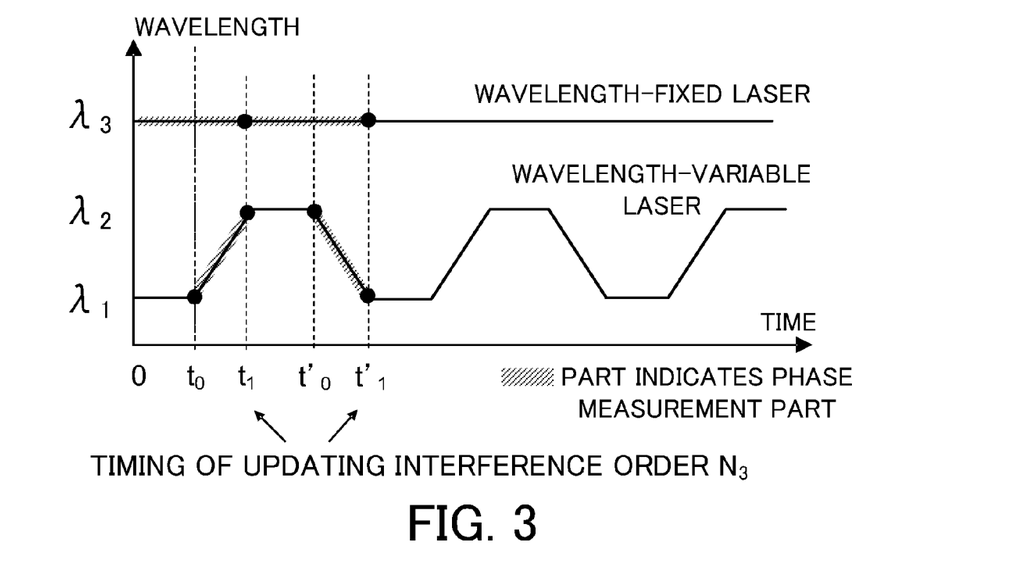
FIG. 3 is a diagram illustrating time changes of wavelengths of light sources in a first embodiment.

The wavelength-variable laser 1 is stabilized to the transmission spectrum of the Fabry-Perot etalon 4 which corresponds to the first reference wavelength $\lambda_1$. After the stabilization control of the wavelength-variable laser 1 is deactivated, the wavelength scanning to the second reference wavelength $\lambda_2$ is performed by the current modulation to stabilize the wavelength of the wavelength-variable laser 1 to the second reference wavelength $\lambda_2$. The same is true for the wavelength scanning from the second reference wavelength $\lambda_2$ to the first reference wavelength $\lambda_1$. Thus, the wavelength-variable laser 1 is stabilized to one of at least two reference wavelengths, i.e. the first reference wavelength $\lambda_1$ and the second reference wavelength $\lambda_2$. The wavelength-variable laser 1 also periodically performs a scanning between the first reference wavelength $\lambda_1$ and the second reference wavelength $\lambda_2$ at high speed. FIG. 3 illustrates a time change of each wavelength of the wavelength-variable laser 1 and the wavelength-fixed laser 2 in the present embodiment. As illustrated in FIG. 3, the wavelength-variable laser 1 has a first time period ($0 \leq t \leq t_0$) in which the wavelength is stabilized to the first reference wavelength $\lambda_1$ and a second time period ($t_1 \leq t \leq t_0'$) in which the wavelength is stabilized to the second reference wavelength $\lambda_2$. In the present embodiment, although the Fabry-Perot etalon 4 is used in addition to the gas cell 3 to improve the accuracy of the reference wavelength, only the gas cell 3 may be used if an accuracy condition for determining the order is met as described below.

When a measurement accuracy of a phase meter is denoted by dφ, conditions for determining interference orders $N_3$ and $M_{23}$ without errors are represented by Expressions (1) and (2).

$$\sqrt{2}\frac{d\phi}{2\pi}\frac{\Lambda_{23}}{\lambda_3} + \frac{2D}{\lambda_3}\frac{d\Lambda_{23}}{\Lambda_{13}} + \frac{2D}{\lambda_3}\frac{d\lambda_3}{\lambda_3} < \frac{1}{2} \quad (1)$$

$$\sqrt{2}\frac{d\phi}{2\pi}\frac{\Lambda}{\Lambda_{23}} + \frac{2D}{\Lambda_{23}}\frac{d\Lambda}{\Lambda} + \frac{2D}{\Lambda_{23}}\frac{d\Lambda_{23}}{\Lambda_{23}} < \frac{1}{2} \quad (2)$$

When D is set to 1.5 m and the third reference wavelength $\lambda_3$ is set to 1.5 μm in Expression (1), the value of $D/\lambda_3$ is $10^6$. On the other hand, the values of $d\Lambda_{23}/\Lambda_{23}$ and $d\lambda_3/\lambda_3$ can be $10^{-7}$ by stabilizing the wavelength with respect to the Fabry-Perot etalon and the gas cell. Therefore, the constraint condition in Inequality (1) is a first term of the left-hand side. When the value of $d\phi/2\pi$ is around $10^{-4}$ [wave], Expression (1) can be met by selecting the second reference wavelength $\lambda_2$ so that $\Lambda_{23}$ becomes 1.5 mm.

In the above conditions, the maximum value of Λ needed in Expression (2) is around 1.5 m, and when it is converted into a wavelength difference of the second reference wavelength $\lambda_2$ and the first reference wavelength $\lambda_1$, i.e. an amount of wavelength scanning, the amount of wavelength scanning becomes an extremely small value of 1.5 μm. In order to realize a large amount of wavelength scanning in the DFB laser diode, a temperature modulation is necessary and there is a problem that it takes time to perform the wavelength scanning. However, if the amount of wavelength scanning is reduced as described above, a high-speed scanning can be realized by the current modulation. If another wavelength-fixed laser that is different from the wavelength-fixed laser 2 is added, the amount of wavelength scanning of the wavelength-variable laser can be further reduced.

The other light beam split by the beam splitter 5 is further split by a beam splitter 18. One of the light beams split by the beam splitter 18 (a first light beam) travels to a polarizing beam splitter 19. The other split light beam (a second light beam) enters a wavelength shifter 11. The wavelength shifter 11 applies a predetermined amount of frequency shift dv for an incident wavelength using an acousto-optic element (not shown) with respect to the light beam outputted from each of the wavelength-variable laser 1 and the wavelength-fixed laser 2. The wavelength shifter 11 rotates the polarized light by 90 degrees using a wave plate (not shown) to emit polarized light orthogonal to the incident polarized light. The light beam emitted from the wavelength shifter 11 travels to the polarizing beam splitter 19. After the first light beam and the second light beam are changed to have a common optical path again by the polarizing beam splitter 19, it is diverged by a beam splitter 21 into two paths.

One of the light beams diverged by the beam splitter 21 enters a spectral element 17. The spectral element 17 separates the light beams of the wavelength-variable laser 1 and the wavelength-fixed laser 2 entering it at the same axis. An arrayed waveguide grating is used as the spectral element 17. However, the present embodiment is not limited to this, and a prism or a bulk diffraction grating can also be used and it may be selected considering required wavelength resolution and cost. As an interference signal of the first light beam and the second light beam in the first reference wavelength $\lambda_1$, a beat signal corresponding to a frequency difference of both the light beams is detected by a phase detector 10b. As an interference signal of the first light beam and the second light beam in the third reference wavelength $\lambda_3$, a beat signal corresponding to a frequency difference of both the light beams is detected by a phase detector 10a. The interference signal of the first light beam and the second light beam is obtained by extracting a common polarization component of the first light beam and the second light beam using a polarizer in each of the phase detectors 10a and 10b. Hereinafter, each of the interference signals detected by the phase detectors 10a and 10b via the spectral element 17 is referred to as a reference signal.

The other light beam diverged by the beam splitter 21 enters a distance measuring interferometer 100. A polarizing beam splitter 20 in the distance measuring interferometer 100 is configured so as to transmit the first light beam and reflect the second light beam. The second light beam reflected by the polarizing beam splitter 20 is reflected on the reference surface 6, and enters a spectral element 16 after it is reflected by the polarizing beam splitter 20. The first light beam transmitted through the polarizing beam splitter 20 is reflected on the surface under test 7, and enters the spectral element 16 after it transmits through the polarizing beam splitter 20. Hereinafter, the light beam reflected on the reference surface 6 is referred to as a reference light beam, and the light beam reflected on the surface under test 7 is referred to as a light beam under test.

The interference signal of the reference light beam and the light beam under test, which has the first reference wavelength $\lambda_1$, is detected by the phase detector 10b. The interference signal of the reference light beam and the light beam under test, which has the third reference wavelength $\lambda_3$, is detected by the phase detector 10a. Thus, each of the phase detectors 10a and 10b (a phase detecting portion) detects a phase based on the interference signal of the reference light beam reflected on the reference surface 6 and the light beam under test, reflected on the surface under test 7. Hereinafter, each of the interference signals detected by the phase detectors 10a and 10b via the spectral element 16 is referred to as a measured signal. The measured signal is the same as the reference signal in that it is a beat signal corresponding to a frequency difference between both the light beams as the interference signal of the first light beam and the second light beam, but the phase of the interference signal is different from the phase of the reference signal depending on the optical path length difference of the light beam under test and the reference light beam.

The polarizing beam splitter 20 that is capable of splitting the polarization components is used as a light beam splitting element of the distance measuring interferometer 100 to be able to separate the light beams that are reflected on the reference surface 6 and the surface under test 7 respectively by the polarization. Therefore, a heterodyne detection between the surface under test 7 and the reference surface 6 can be performed by adding a slight frequency shift difference between the two polarized lights orthogonal to each other, and a highly-accurate phase measurement can be realized. In the present embodiment, the polarizing beam splitter 20 is used as the light beam splitting element of the distance measuring interferometer 100, but the present embodiment is not limited to this and a non-polarizing beam splitter may also be used. In this case, a λ/8 plate is disposed between the non-polarizing beam splitter and the reference surface 6, and the intensity of each polarization component is detected via the polarizing beam splitter after the reflected light beam on the reference surface 6 and the reflected light beam on the surface under test 7 are superimposed again. The phases of the detected two interference signals are shifted by 0 degree and 90 degrees, respectively. The phase measurement may be performed based on these two interference signals. In this case, since the phase measurement accuracy is reduced although it is easily configured, for example it is necessary to enlarge the amount of wavelength scanning based on Expressions (1) and (2).

Furthermore, an environment measurement unit 9 that determines an atmospheric refractive index near the surface under test 7 is disposed near the surface under test 7. The environment measurement unit 9 is configured by including measurement sensors of atmospheric temperature and atmospheric pressure. The temperature sensitivity of the atmospheric refractive index is 1 ppm/deg C. and the atmospheric pressure sensitivity is 0.3 ppm/hPa, and the refractive index of around 0.1 ppm can be easily ensured even if a relatively inexpensive thermometer or barometer is used. In the present embodiment, the measured wavelength is corrected based on the atmospheric refractive index measured by the environment measurement unit 9, but the measurement of the refractive index is not necessary when the atmospheric wavelength is controlled by using an etalon or the like of an air gap that is disposed near the environment measurement unit 9.

The analyzer 8 inputs the reference signal, the measured signal, and the signal from the environment measurement unit 9, and calculates an absolute distance between the surface under test 7 and the reference surface 6, i.e. an optical path difference of the light beam under test and the reference light beam. Furthermore, the analyzer 8 is coupled to the wavelength control apparatus 14, and performs the wavelength control of the wavelength-variable laser 1 in accordance with a measurement flow. In the present embodiment, when a plurality of distance measuring interferometers 100 are disposed for one light source unit 200, it can be easily applied by splitting light beams between the light source unit 200 and the beam splitter 18.

Figure 4:
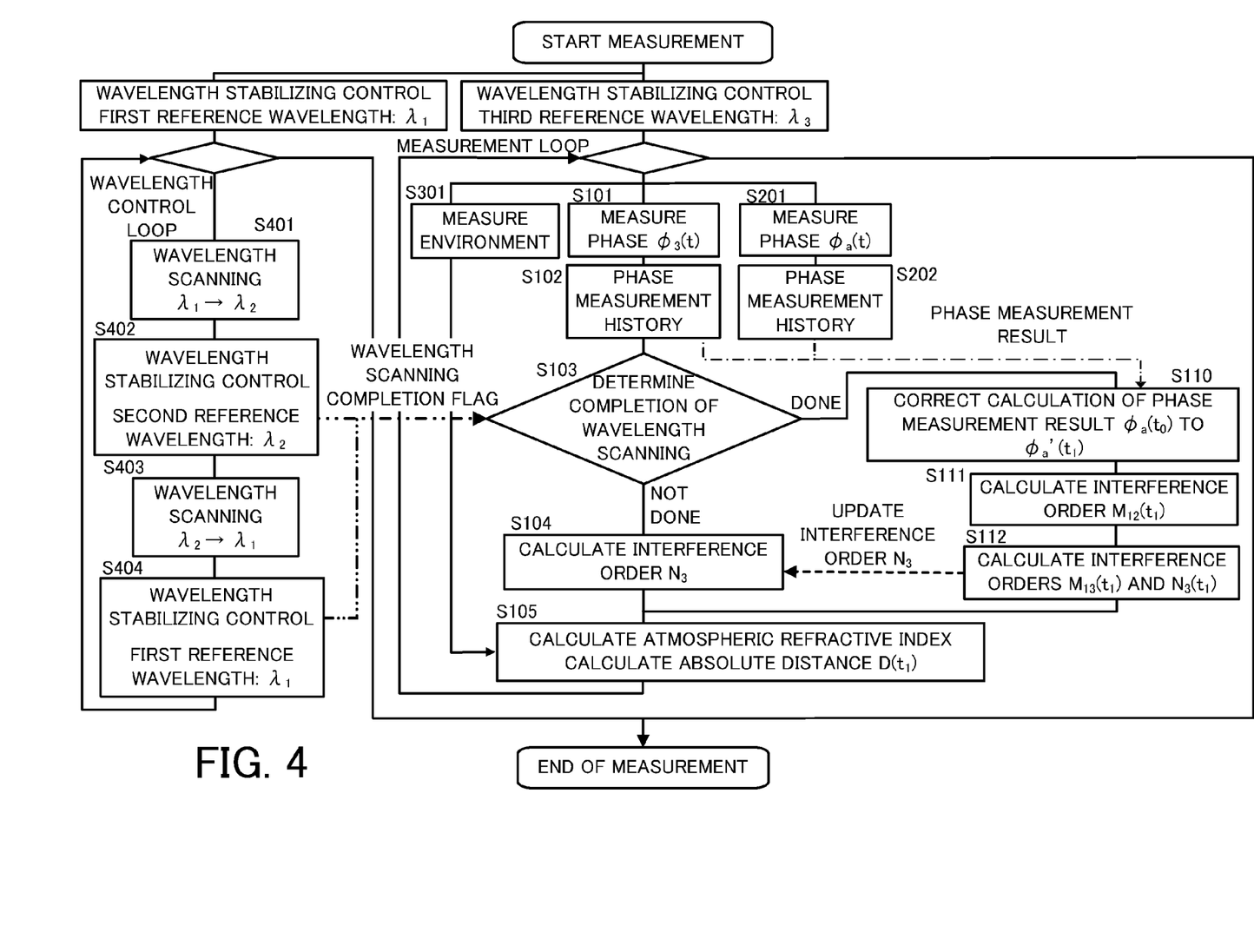
FIG. 4 is a flowchart of a measurement method in first and second embodiments.

Next, referring to FIG. 4, a measurement method in the present embodiment will be described. FIG. 4 is a flow chart of the measurement method in the present embodiment. The flow is roughly divided into two loops. One is a wavelength control loop, and the other is a measurement loop. The wavelength control loop is performed based on instructions of the wavelength control apparatus 14. The measurement loop is performed based on instructions of the analyzer 8. In the measurement loop, a flow that performs a relative length measurement at high speed in Steps S101 to S105 and a flow that performs an absolute length measurement in Steps S101 to S103, S110 to S112, and S105 are included.

As illustrated in FIG. 3, in the wavelength control loop, the wavelength-variable laser 1 is scanned between the first reference wavelength $\lambda_1$ and the second reference wavelength $\lambda_2$ (Steps S401 and S403), and then the stabilized control is repeatedly performed so that the wavelength is stabilized to one of the reference wavelengths (Steps S402, S404). In Steps 402 and S404, after the control to the reference wavelength is completed, a wavelength scanning completion flag is sent to Step S103 at the measurement loop side. In Step S103, receiving the wavelength scanning completion flag, it is determined whether the wavelength scanning is completed.

Next, the measurement loop illustrated in FIG. 4 will be described. First of all, in Steps S101 and S201, the phase measurement is performed in the first reference wavelength $\lambda_1$ and the third reference wavelength $\lambda_3$. In Step S301, the environment measurement is performed. In this time, an environment measurement result of the atmosphere of the light beam under test from the environment measurement unit 9 is loaded by the analyzer 8. In the present embodiment, the humidity of the optical path under test is guaranteed, and the atmospheric temperature t and the atmospheric pressure p are measured as the environment measurement.

The phase measurement means that the phase difference between the measured signal and the reference signal is measured, and is obtained by measuring the phases of the reference signal and the measured signal by a phase meter in the analyzer 8 to calculate the difference. A phase connection is performed for the measured phase, and it continuously changes with respect to the time.

Next, using expressions, the measured phase will be described. First of all, parameters are set as follows. An optical path length difference between the light beam under test and the reference light beam from the emission of the wavelength-variable laser 1 to the polarizing beam splitter 19 is defined as L1, and an optical path length difference of the light beam under test and the reference light beam from the polarizing beam splitter 19 to the phase detector 10a or the phase detector 10b is defined as $2n(\lambda)D$. In this case, $n(\lambda)$ denotes a refractive index of the optical path of the light beam under test, and D denotes an absolute distance between the reference surface and the surface under test. Using the above parameters, each of a reference signal $I_{ref}$ and a measured signal $I_{test}$ is represented by Expression (3).

$$\begin{cases} I_{ref} = I_0 \cos\left(2\pi\left(dvt + \dfrac{L_1}{\lambda_{11}}\right)\right) \\ I_{test} = I_0 \cos\left(2\pi\left(dvt + \dfrac{L_1}{\lambda_{11}} + \dfrac{2n(\lambda_{11})D}{\lambda_{11}}\right)\right) \end{cases} \quad (3)$$

In accordance with Expression (3), when the wavelength and the absolute distance between the reference surface and the surface under test continuously change with the passage of time, a phase $\Phi(t)$ depending on the time is represented by Expression (4).

$$\Phi(t) = 2\pi \cdot \frac{2n(\lambda(t))D(t)}{\lambda(t)} \quad (4)$$

In order to represent the phase at certain time in a range of 0 to $2\pi$, Expression (5) is used.

$$\phi(t) = 2\pi \cdot \mathrm{mod}\left(\frac{\Phi(t)}{2\pi}, 1\right) \quad (5)$$
$$= 2\pi \cdot \mathrm{mod}\left(\frac{2n(\lambda(t))D(t)}{\lambda(t)}, 1\right)$$

According to Expression (5), a phase $\phi_a(t_0)$ of the wavelength-variable laser 1 that are measured in Step S201 is represented by Expression (6). As illustrated in FIG. 3, the wavelength of the wavelength-variable laser 1 is the first reference wavelength $\lambda_1$ at the time $t_0$. In Expression (6), "mod(u, k)" means a remainder of a first argument for a second argument k.

$$\phi_a(t_0) = 2\pi \cdot \mathrm{mod}\left(\frac{\Phi_a(t_0)}{2\pi}, 1\right) \quad (6)$$
$$= 2\pi \cdot \mathrm{mod}\left(\frac{2n(\lambda_1)D(t_0)}{\lambda_1}, 1\right)$$

An integer component of the phase in this case is represented by Expression (7) using Expression (4). In Expression (7), "round( )" means a function that rounds an argument to an integer.

$$\text{Integer component of } \Phi_a(t_0) = \text{round}(\Phi_a(t_0)) \tag{7}$$

A phase $\phi_3(t_0)$ that is measured in Step S101 is represented by Expression (8). As illustrated in FIG. 3, the wavelength of the wavelength-fixed laser 2 is always the third reference wavelength $\lambda_3$.

$$\phi_3(t_0) = 2\pi \cdot \text{mod}\left(\frac{\Phi_3(t_0)}{2\pi}, 1\right) \tag{8}$$
$$= 2\pi \cdot \text{mod}\left(\frac{2n(\lambda_3)D(t_0)}{\lambda_3}, 1\right)$$

The histories of the phase measurement results obtained in Steps S101 and S201 are stored in Steps S102 and S202, respectively.

In Step S103, based on the wavelength scanning completion flag sent from Steps S402 and S404 of the wavelength control loop, it is determined whether the wavelength scanning is completed. The flow proceeds to Step S104 when the wavelength scanning is not completed yet, and on the other hand, the flow proceeds to Step S110 when the wavelength scanning is completed.

First of all, a case where the wavelength scanning is not completed yet in Step S103 will be described. In this case, in Step S104, based on the measurement result of the phase connection in Step 5102, an interference order $N_3$ is calculated by Expression (9) using an interference order $N_3(i)$ and a phase measurement result $_3(i)$ at the time of the previous measurement and a current phase measurement result $\Phi_3(i+1)$.

$$N_3(i+1) = N_3(i) + \text{round}(\Phi_3(i+1) - \Phi_3(i)) \tag{9}$$

Then, in Step S105, the analyzer 8 calculates the absolute distance D using the relative phase change of the third reference wavelength $\lambda_3$ and the atmospheric wavelength corrected based on the environment measurement result in Step S301. The details will be described below. Thus, the analyzer 8 calculates the absolute distance D using the high-speed relative length measurement and the interference order $N_3$ until the flag of the completion of the next wavelength scanning is confirmed. Then, the flow returns to the beginning of the measurement loop.

Next, a case where the wavelength scanning is completed in Step S103 will be described. In Step S110, the changes of a position of the surface under test at the time of measuring the phase of the two synthetic wavelengths and at the time of measuring the phase change amount in the wavelength scanning are corrected using the calculation result of the relative displacement of the third reference wavelength $\lambda_3$. In other words, the relative displacement of the surface under test 7 is calculated based on the phase change of the third reference wavelength $\lambda_3$ in the wavelength scanning, and the interference orders of the synthetic wavelengths $\Lambda_{12}$ and $\Lambda_{13}$ are corrected so as not to be influenced by the relative displacement of the surface under test 7. The phase of the wavelength-variable laser 1 at the time $t_1$ is obtained by Expression (10).

$$\phi_a(t_1) = 2\pi \cdot \text{mod}\left(\frac{\Phi_a(t_1)}{2\pi}, 1\right) \tag{10}$$

$$= 2\pi \cdot \text{mod}\left(\frac{2n(\lambda_2)D(t_1)}{\lambda_2}, 1\right)$$

The integer component of the phase at this time is represented by Expression (11) using Expression (4).

$$\text{Integer component of } \Phi_a(t_1) = \text{round}(\Phi_a(t_1)) \tag{11}$$

On the other hand, the phase $\phi_3(t_1)$ of the wavelength-fixed laser 2 at the time $t_1$ is represented by Expression (12). The analyzer 8 calculates the absolute distance D at the time $t_1$ using this phase result.

$$\phi_3(t_1) = 2\pi \cdot \text{mod}\left(\frac{\Phi_3(t_1)}{2\pi}, 1\right) \tag{12}$$
$$= 2\pi \cdot \text{mod}\left(\frac{2n(\lambda_3)D(t_1)}{\lambda_3}, 1\right)$$

In accordance with Expression (4), the relative displacement $\Delta D(t_0-t_1)$ is calculated by Expression (13) based on the continuous phase changes between the times $t_0$ to $t_1$.

$$\Delta D(t_0 \sim t_1) = \frac{\lambda_3}{4\pi n(\lambda_3)}(\Phi_3(t_1) - \Phi_3(t_0)) \tag{13}$$

The phase $\Phi_a(t_0)$, i.e. the measurement phase result, that is stored as a history in Step S202 is corrected to a phase $\phi'_a(t_1)$ in the absolute distance $D(t_1)$ using Expression (14) in a state where the first reference wavelength $\lambda_1$ is maintained.

$$\phi'_a(t_1) = 2\pi \cdot \text{mod}\left(\frac{\Phi_a(t_0)}{2\pi} + \frac{2n(\lambda_1)}{\lambda_1}\Delta D(t_0 \sim t_1), 1\right) \tag{14}$$

In Step S111, an interference order $M_{12}(t_1)$ of the absolute distance Dat the measurement time $t_1$ is calculated.

Figure 5:
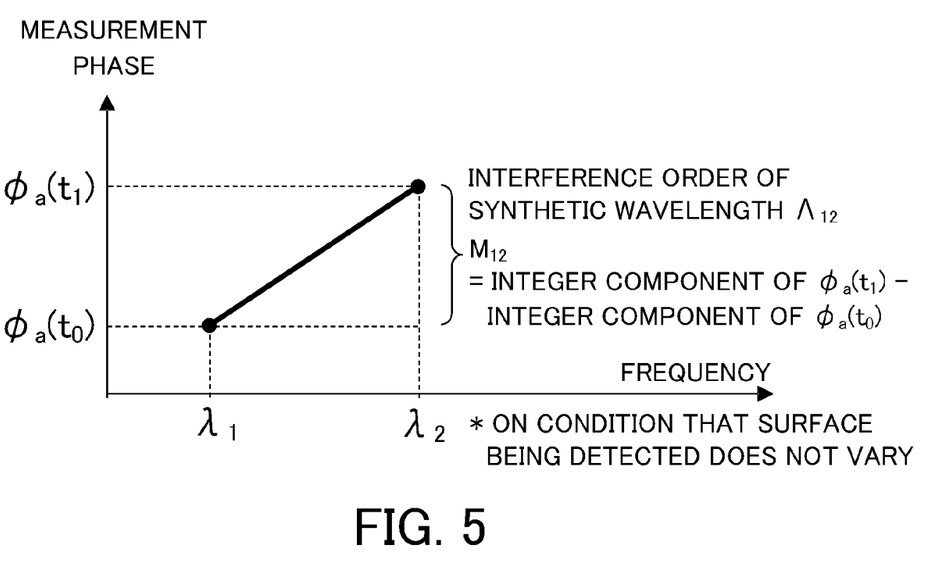
FIG. 5 is a conceptual diagram of an interference order $M_{12}$ in first and second embodiments.

First of all, referring to FIG. 5, the interference order $M_{12}$ in a case where the surface under test does not vary at the wavelength scanning time (D(t)=constant) will be described. FIG. 5 is a conceptual diagram of the interference order $M_{12}$ in the present embodiment. When the surface under test does not vary, the interference order $M_{12}$ is calculated by subtracting the integer component of the phase $\Phi_a(t_0)$ at the time $t_0$ from the integer component of the phase $\Phi_a(t_1)$ at the time $t_1$. However, since the absolute distance D is different depending on each time when the surface under test varies, the phase change caused by the variation of the surface under test is contained in the interference order $M_{12}$. Therefore, when the wavelength scanning is performed between the first reference wavelength $\lambda_1$ and the second reference wavelength $\lambda_2$, the interference order $M_{12}(t)$ is calculated by using a correction expression represented by Expression (15).

$$M_{12}(t_1) = \text{round}(\Phi_a(t_1)) - \text{round}\left(\Phi_a(t_0) + \frac{4\pi n}{\lambda_1}\Delta D(t_0 \sim t_1)\right) \tag{15}$$

In accordance with Expressions (10) and (14), the interference order $M_{12}(t_1)$ is represented by Expression (16). In Expression (16), $\Lambda_{12}$ is a synthetic wavelength of the first reference wavelength $\lambda_1$ and the second reference wavelength $\lambda_2$, and $n_g(\lambda_1, \lambda_2)$ denotes a group refractive index for the first reference wavelength $\lambda_1$ and the second reference wavelength $\lambda_2$.

$$\begin{cases} M_{12}(t_1) = \dfrac{2n_g(\lambda_1, \lambda_2)D(t_1)}{\Lambda} - (\phi_a(t_1) - \phi'_a(t_1)) \\ \Lambda_{12} = \dfrac{\lambda_1 \lambda_2}{|\lambda_2 - \lambda_1|} \end{cases} \quad (16)$$

In Step S112, an interference order $N_3(t_1)$ of the interference measurement by the third reference wavelength $\lambda_3$ is calculated. First of all, a first absolute distance $D(t_1)$ is calculated by Expression (17) using the synthetic wavelength $\Lambda_{12}$.

$$D(t_1) = \dfrac{\Lambda_{12}}{2n_g(\lambda_1, \lambda_2)}\left(M_{12}(t_1) + \dfrac{\phi_a(t_1) - \phi'_a(t_1)}{2\pi}\right) \quad (17)$$

When the synthetic wavelength of the second reference wavelength $\lambda_2$ and the third reference wavelength $\lambda_3$ is denoted by $\Lambda_{23}$, the relationships between the first absolute distance $D(t_1)$ and the third reference wavelength $\lambda_3$ and between the first absolute distance $D(t_1)$ and the synthetic wavelength $\Lambda_{23}$ are represented by Expressions (18) and (19), respectively.

$$D(t_1) = \dfrac{\lambda_3}{2n(\lambda_3)}\left(N_3(t_1) + \dfrac{\phi_3(t_1)}{2\pi}\right) \quad (18)$$

$$D(t_1) = \dfrac{\Lambda_{23}}{2n_g(\lambda_1, \lambda_2)}\left(M_{23}(t_1) + \dfrac{\phi_3(t_1) - \phi_a(t_1)}{2\pi}\right) \quad (19)$$

In Expressions (17), (18), and (19), since each of the wavelength and the synthetic wavelengths has a relation of $\lambda_3 \ll \Lambda_{23} \ll \Lambda_{12}$, the interference orders $N_3(t_1)$ and $M_{23}(t_1)$ are represented by Expression (20). The interference order $N_3$ obtained in Step S112 is sent to Step S104, and the interference order $N_3$ stored in Step S104 is updated.

$$\begin{cases} N_3(t_1) = \mathrm{round}\left(\left(M_{23}(t_1) + \dfrac{\phi_3(t_1) - \phi_a(t_1)}{2\pi}\right)\dfrac{n(\lambda_3)\Lambda_{23}}{n_g(\lambda_2, \lambda_3)\lambda_3} - \dfrac{\phi_3(t_1)}{2\pi}\right) \\ M_{23}(t_1) = \mathrm{round}\left(\dfrac{\left(M_{12}(t_1) + \dfrac{\phi_a(t_1) - \phi'_a(t_1)}{2\pi}\right)}{\dfrac{n_g(\lambda_2, \lambda_3)\Lambda_{12}}{n_g(\lambda_1, \lambda_2)\Lambda_{23}}} - \dfrac{\phi_3(t_1) - \phi_a(t_1)}{2\pi}\right) \end{cases} \quad (20)$$

Next, the atmospheric refractive index and the absolute distance D are calculated in Step S105. First of all, the atmospheric refractive index n of the dry air is calculated by Expression (21) of Edlen based on the temperature t [deg C.] and the pressure p [Pa].

$$\begin{cases} n(\lambda) = 1 + \dfrac{p \cdot 10^{-8}}{96095.43}\left[8342.54 + \dfrac{2406147}{130 - S(\lambda)} + \dfrac{15998}{38.9 - S(\lambda)}\right]\left[\dfrac{1 + 10^{-8}(0.601 - 0.00972t)p}{1 + 0.003661t}\right] \\ S(\lambda) = 1/(\lambda_3 \cdot 10^6)^2 \end{cases} \quad (21)$$

When the environment of the light beam under test is not the dry air in the present embodiment, it is preferable that a hygrometer is added to the environment measurement unit 9. In this case, The Edlen's expression containing a humidity correction term may be used instead of Expression (21). In the present embodiment, although the environment measurement unit 9 is used as a refractive index measuring portion in the present embodiment, the present embodiment is not limited to this and for example a refractive index measuring interferometer may also be used. The refractive index measuring interferometer calculates a refractive index based on an interference signal generated by an optical path difference of an atmospheric reference optical path that has an atmospheric optical path that has the same length as that of a vacuum reference optical path.

Finally, the absolute distance $D(t_1)$ is calculated. The absolute distance $D(t_1)$ in Step S105 is calculated by Expression (22). In Expression (22), phases of the first reference wavelength $\lambda_1$, the second reference wavelength $\lambda_2$, and the third reference wavelength $\lambda_3$ are defined as $\phi_1$, $\phi_2$, and $\phi_3$, respectively. The atmospheric refractive indexes for the third reference wavelength $\lambda_3$, the first synthetic wavelength $\Lambda_{12}$, and the second synthetic wavelength $\Lambda_{13}$ are defined as $n(\lambda_3)$, $n_g(\lambda_1, \lambda_2)$, and $n_g(\lambda_1, \lambda_3)$, respectively.

$$D(t_1) = \quad (22)$$
$$\dfrac{\lambda_3}{2n(\lambda_3)}\left(\mathrm{round}\left(\left(\mathrm{round}\left(\left(M_{12}(t_1) + \dfrac{\phi_a(t_1) - \phi'_a(t_1)}{2\pi}\right)\dfrac{n_g(\lambda_1, \lambda_3)\Lambda_{12}}{n_g(\lambda_1, \lambda_2)\Lambda_{23}} - \dfrac{\phi_3(t_1) - \phi_a(t_1)}{2\pi}\right) + \dfrac{\phi_3(t_1) - \phi_a(t_1)}{2\pi}\right)\dfrac{n(\lambda_3)\Lambda_{23}}{n_g(\lambda_1, \lambda_3)\lambda_3} - \dfrac{\phi_3(t_1)}{2\pi}\right) + \dfrac{\phi_3(t_1)}{2\pi}\right)$$

In the present embodiment, the flow in which the absolute distance at the time $t_1$ is calculated based on the phase measurement result between the times $t_0$ to $t_1$ (the wavelength scanning of $\lambda_1$ to $\lambda_2$) illustrated in FIG. 3 is described. However, the present embodiment is not limited to this, and similarly the absolute distance at the time $t_1'$ can also be calculated using the phase measurement result between the time $t_0'$ to $t_1'$ (the wavelength scanning of $\lambda_2$ to $\lambda_1$)

Thus, the absolute length measurement can be always performed by periodically scanning the wavelength of the wavelength-variable laser at high speed. Therefore, according to the present embodiment, the amount of wavelength scanning can be reduced and the lightwave interference measurement apparatus capable of performing a high-speed absolute distance measurement in an easy configuration can be provided.

Second Embodiment

Figure 6:
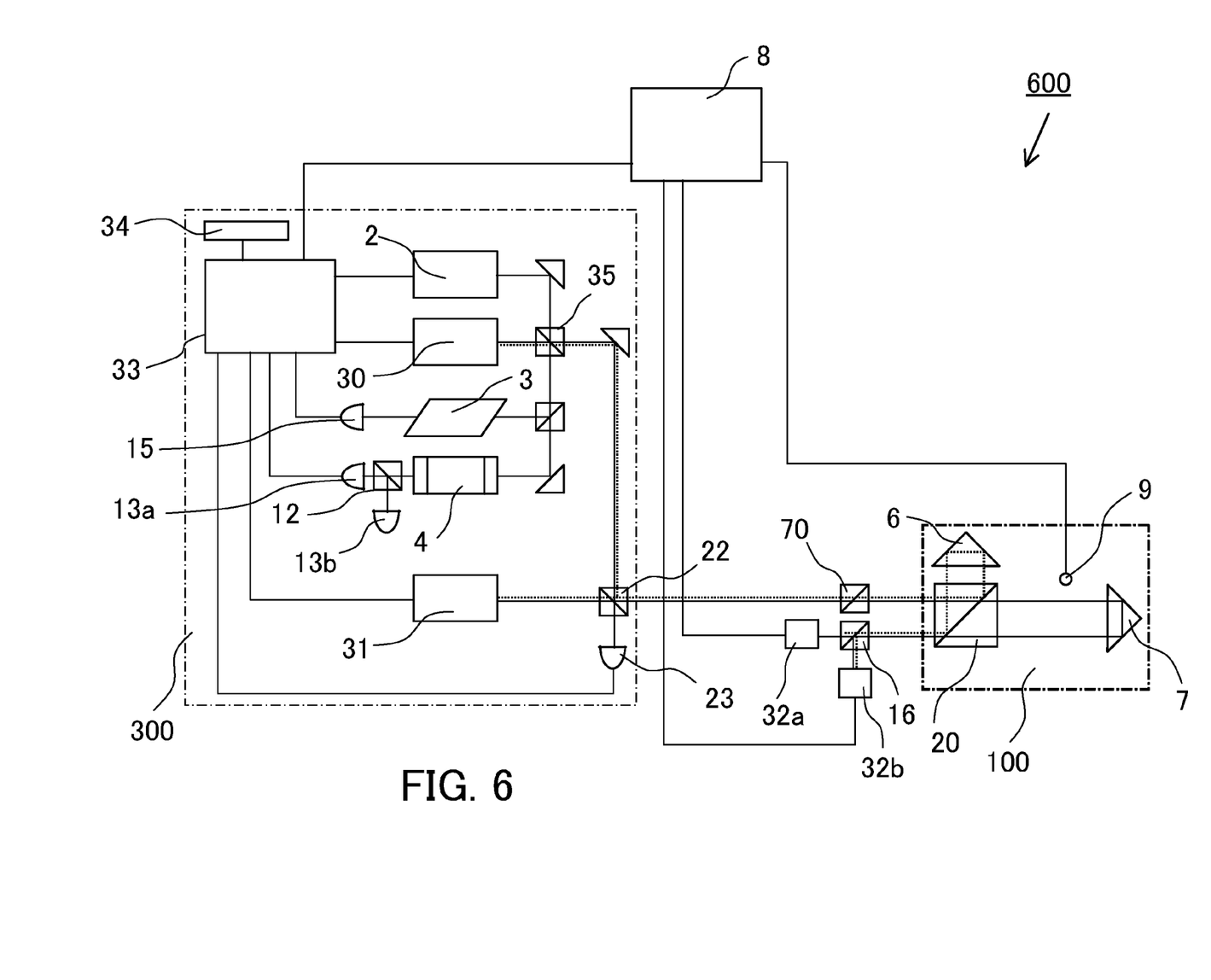
FIG. 6 is a configuration diagram of a lightwave interference measurement apparatus in a second embodiment.

Next, a lightwave interference measurement apparatus in a second embodiment of the present invention will be described. FIG. 6 is a configuration diagram of a lightwave interference measurement apparatus 600 in the present embodiment. The present embodiment is different from the first embodiment in that a wavelength-variable laser 31 in which a frequency offset lock is performed with reference to the wavelength-fixed laser 30 is used instead of the wavelength-variable laser 1 in the first embodiment and that a homodyne method is used as a phase detection method. The wavelength-fixed laser 30 is a frequency-stabilized light source, and functions as a wavelength reference element of the wavelength-variable laser 31.

In the present embodiment, a light beam emitted from the wavelength-fixed laser 30 is split by a beam splitter 35. A light beam emitted from the wavelength-fixed laser 2 that has a wavelength different from the wavelength of the wavelength-fixed laser 30 also enters the beam splitter 35, and the light beam is also split when its ray axis becomes coaxial with reference to that of the wavelength-variable laser 30. One of the light beams split by the beam splitter 35 transmits through the Fabry-Perot etalon 4, and then it is separated by the spectral element 12 into light beams of the wavelength-fixed laser 30 and the wavelength-fixed laser 2. An amount of light after transmitting through the Fabry-Perot etalon 4 is detected by a detector 13a for the light beam of the wavelength-fixed laser 30 and by a detector 13b for the light beam of the wavelength-fixed laser 2.

The other light beam split by the beam splitter 35 travels to a polarizing beam splitter 22, and the light beam of the wavelength-fixed laser 30 transmits through the polarizing beam splitter 22 to enter a detector 23. The light beam of the wavelength-fixed laser 2 is reflected on the polarizing beam splitter 22, and then it enters a distance measuring interferometer 100. The light beam emitted from the wavelength-variable laser 31 also enters the polarizing beam splitter 22, and the light beam is also split when its ray axis becomes coaxial with reference to that of the wavelength-variable laser 30. First light beam of the split light beams enters the detector 23, and second light beam of them enters the distance measuring interferometer 100. The detector 23 detects a beat signal that corresponds to a frequency of a difference of the wavelength-variable laser 31 and the wavelength-fixed laser 30.

The phase of the beam signal is compared with a phase of a signal from a frequency synthesizer 34 that outputs a known frequency signal using a phase detector in the wavelength control apparatus 33. Then, the frequency of the wavelength-variable laser 31 is stabilized to a frequency that is obtained by offsetting the frequency of the frequency synthesizer 34 to the frequency of the wavelength-fixed laser 30. In the present embodiment, when the frequency of the frequency synthesizer 34 is swept, the wavelength of the wavelength-variable laser 31 is also scanned following it. The wavelength-variable laser 31 can be freely stabilized between the first reference wavelength $\lambda_1$ and the second reference wavelength $\lambda_2$, and it periodically scans between these wavelengths (between $\lambda_1$ and $\lambda_2$) at high speed.

Figure 7:
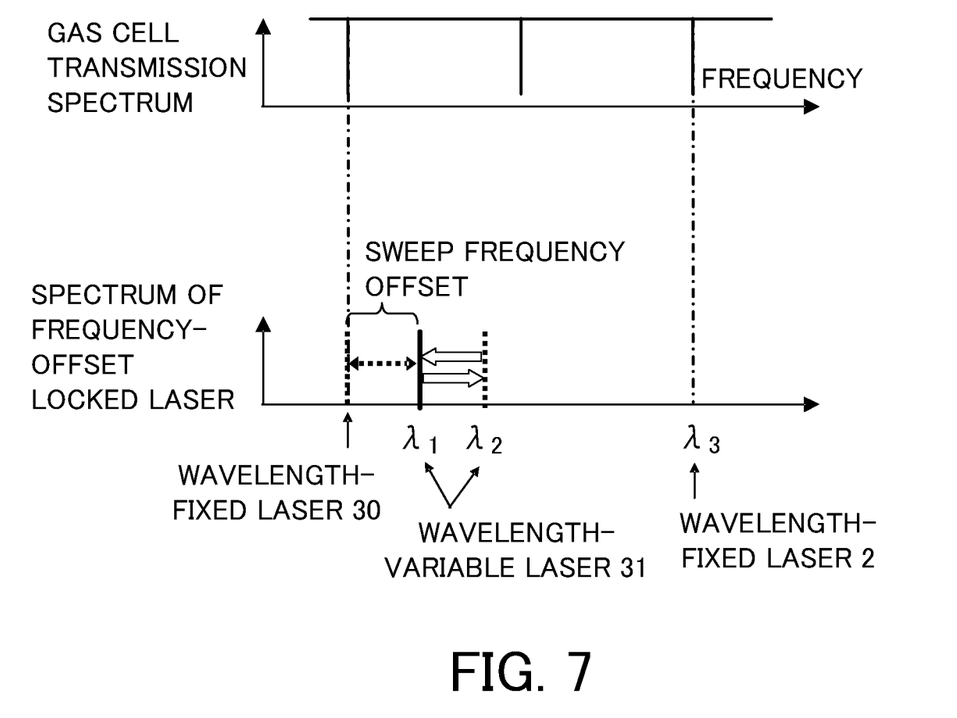
FIG. 7 is a diagram illustrating relationships of wavelengths of light sources in a second embodiment.

FIG. 7 is a diagram illustrating a transmission spectrum of the gas cell 3 and spectra of the wavelength-variable laser 31, the wavelength-fixed laser 30, and the wavelength-fixed laser 2. The emission light beam of the wavelength-fixed laser 2 enters the gas cell 3, and it is stabilized to the third reference wavelength $\lambda_3$. The emission light beam of the wavelength-fixed laser 30 also enters the gas cell 3, and it is stabilized to a transmission spectrum that corresponds to a wavelength shorter than the first reference wavelength $\lambda_1$.

The light beam entering the distance measuring interferometer 100 enters phase detecting unit 32a and 32b (a phase detector), and an interference signal by an optical path difference between the surface under test 7 and the reference surface 6 is generated. The phase detecting unit 32a detects an interference phase by the optical path difference between a reference optical path and an optical path under test in the first reference wavelength $\lambda_1$ via the spectral element 16. On the other hand, the phase detecting unit 32b detects an interference phase by the optical path difference between the reference optical path and the optical path under test in the second reference wavelength $\lambda_2$.

Since the polarizing beam splitter 20 is used as a light beam separating element of the distance measuring interferometer 100 also in the present embodiment, the light beams reflected on the reference surface 6 and the surface under test 7 respectively can be separated by the polarization. Therefore, homodyne detection by the phase different control using the polarization difference can be performed, and highly-accurate phase detection can be realized.

Figure 8:
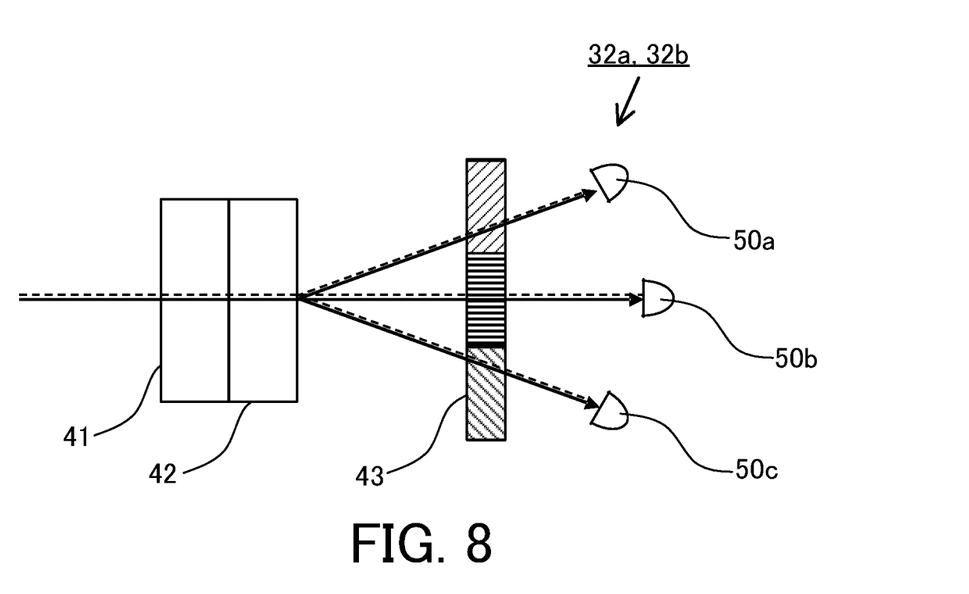
FIG. 8 is a configuration diagram of a phase detecting unit in a second embodiment.

FIG. 8 is a configuration diagram of the phase detecting units 32a and 32b. The phase detecting unit 32a and 32b convert the polarizations of the light beam under test and the reference light beam into a clockwise circular polarization and a counterclockwise circular polarization by using a $\lambda/4$ plate 41 having a fast axis that is 45 degrees with reference to a polarizing axis angle of the light beam under test and the reference light beam. The light beam after the polarization conversion is split by a grating beam splitter 42 into three light beams of 0th and ±1st order diffracted lights that have an equivalent amount of light. The three split light beams transmit through a polarizer array 43 that is disposed so that an angle of the transmission polarized light is different from each of the light beams, and an amount of interference signal light of each of three polarization directions is detected by detectors 50a, 50b, and 50c. When each of the polarizers of the polarizer array 43 is arranged at an angle having a pitch of 120 degrees, amounts of lights $I_a$, $I_b$, and $I_c$ that are obtained by the detectors 50a, 50b, and 50c are represented by Expression (23).

$$\begin{cases} I_a = I_0\{1 + V\cos(\phi)\} \\ I_b = I_0\{1 + V\cos(\phi + 2\pi/3)\} \\ I_c = I_0\{1 + V\cos(\phi + 4\pi/3)\} \end{cases} \quad (23)$$

In Expression (23), $\phi$ is a phase difference of the interference signal caused by the optical path length difference between the light beam under test and the reference light beam. In accordance with Expression (23), the phase difference $\phi$ is calculated using Expression (24).

$$\phi = \tan^{-1}\left(\frac{-\sqrt{3}\,(I_b - I_c)}{2I_a - I_b - I_c}\right) \quad (24)$$

The phase detecting units 32a and 32b are coupled to the analyzer 8. The analyzer 8 detects a phase depending on the optical path lengths of the light beams under test and the reference light beam in the first reference wavelength $\lambda_1$ and a phase depending on the optical path lengths of the light beam under test and the reference light beam in the third reference wavelength $\lambda_3$ using Expression (24) based on the result of detecting the amounts of lights.

The phase detecting units 32a and 32b in the present embodiment detects the interference signal intensity in three known phase differences in the configuration illustrated in FIG. 8, but the interference signal intensity in a plurality of known phase differences may also be detected in another configuration. For example, the phase detecting unit may also be configured so as to generate a tilt stripe between the light beam under test and the reference light beam using a prism having a birefringence to detect the amount of light by spatially generating a phase difference. Furthermore, the number of the known phase differences or the interval of the known phase differences are not limited as described above, and it maybe appropriately selected in accordance with required accuracy.

Since there is no high-frequency signal in the homodyne detection of the present embodiment, an inexpensive detection system can be configured compared with that of the heterodyne detection of the first embodiment. With regard to the phase measurement accuracy, the performance of around $10^{-4}$ [wave] that is similar to that of the heterodyne detection can be realized by correcting characteristics of the gains, the offsets, and the phases of the detectors $50a$, $50b$, and $50c$. In the present embodiment, similarly to the first embodiment, the environment measurement unit 9 to determine the atmospheric refractive index near the surface under test is disposed near the surface under test 7. The measurement method of the present embodiment is the same as that of the first embodiment, and therefore the description of the method is omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-043690, filed on Mar. 1, 2010, which is hereby incorporated by reference herein in its entirety.

What is claimed is:

1. A lightwave interference measurement apparatus comprising:
   a wavelength-variable laser configured to periodically perform wavelength scanning between a first reference wavelength $\lambda_1$ and a second reference wavelength $\lambda_2$ to emit light beam;
   a wavelength-fixed laser configured to emit light beam having a third reference wavelength $\lambda_3$;
   a wavelength reference element configured to be able to set a wavelength of the light beam emitted from the wavelength-variable laser to the first reference wavelength $\lambda_1$ and the second reference wavelength $\lambda_2$;
   a light beam splitting element configured to split the light beams emitted from the wavelength-variable laser and the wavelength-fixed laser into reference light beam and light beam under test;
   a phase detector configured to detect a phase based on an interference signal of the reference light beam that is reflected on a reference surface and the light beam under test that is reflected on a surface under test; and
   an analyzer configured to sequentially determine an interference order of the third reference wavelength $\lambda_3$ based on the third reference wavelength $\lambda_3$, a first synthetic wavelength $\Lambda_{12}$, a second synthetic wavelength $\Lambda_{13}$, an integer component of a phase change amount in the wavelength scanning, and interference orders of the first synthetic wavelength $\Lambda_{12}$ and the second synthetic wavelength $\Lambda_{13}$, and calculates an absolute distance between the surface under test and the reference surface, where the first synthetic wavelength $\Lambda_{12}$ is represented by $\lambda_1 \cdot \lambda_2 / |\lambda_1 - \lambda_2|$ and the second synthetic wavelength $\Lambda_{13}$ is represented by $\lambda_1 \cdot \lambda_3 / |\lambda_1 - \lambda_3|$.

2. The lightwave interference measurement apparatus according to claim 1,
   wherein the analyzer calculates a relative displacement of the surface under test based on a phase change of the third reference wavelength $\lambda_3$ in the wavelength scanning, and corrects the interference orders of the first synthetic wavelength $\Lambda_{12}$ and the second synthetic wavelength $\Lambda_{13}$ so as not to be influenced by the relative displacement of the surface under test.

3. The lightwave interference measurement apparatus according to claim 1,
   wherein the analyzer calculates a relative displacement $\Delta D(t_0 - t_1)$ of the surface under test between times $t_0$ to $t_1$ based on a phase change of the third reference wavelength $\lambda_3$ in the wavelength scanning from the first reference wavelength $\lambda_1$ to the second reference wavelength $\lambda_2$, corrects a phase $\Phi_a(t_0)$ of the first reference wavelength $\lambda_1$ at time $t_0$ to a phase $\phi_a'(t_1)$ at time $t_1$ using the following Expression (1), and calculates an interference order $M_{12}(t_1)$ of the first synthetic wavelength $\Lambda_{12}$ using the following Expression (2)

$$\phi_a'(t_1) = 2\pi \cdot \mathrm{mod}\left(\frac{\Phi_a(t_0)}{2\pi} + \frac{2n(\lambda_1)}{\lambda_1}\Delta D(t_0 \sim t_1), 1\right) \quad (1)$$

$$M_{12}(t_1) = \mathrm{round}(\Phi_a(t_1)) - \mathrm{round}\left(\Phi_a(t_0) + \frac{4\pi n}{\lambda_1}\Delta D(t_0 \sim t_1)\right). \quad (2)$$

4. The lightwave interference measurement apparatus according to claim 3,
   wherein the analyzer calculates the absolute distance between the reference surface and the surface under test by the following expression using phases $\phi_1$, $\phi_2$, and $\phi_3$ of the first reference wavelength $\lambda_1$, the second reference wavelength $\lambda_2$, and the third reference wavelength $\lambda_3$, respectively, and atmospheric refractive indexes $n(\lambda_3)$, $n_g(\lambda_1, \lambda_2)$, and $n_g(\lambda_1, \lambda_3)$ for the third reference wavelength $\lambda_3$, the first synthetic wavelength $\Lambda_{12}$, and the second synthetic wavelength $\Lambda_{13}$, respectively $$D(t_1) = \frac{\lambda_3}{2n(\lambda_3)}\left(\mathrm{round}\left(\left(\mathrm{round}\left((M_{12}(t_1) + \frac{\phi_a(t_1) - \phi_a'(t_1)}{2\pi}\right)\frac{n_g(\lambda_1, \lambda_3)\Lambda_{12}}{n_g(\lambda_1, \lambda_2)\Lambda_{23}} - \frac{\phi_3(t_1) - \phi_a(t_1)}{2\pi}\right) + \frac{\phi_3(t_1) - \phi_a(t_1)}{2\pi}\right)\frac{n(\lambda_3)\Lambda_{23}}{n_g(\lambda_1, \lambda_3)\lambda_3} - \frac{\phi_3(t_1)}{2\pi}\right) + \frac{\phi_3(t_1)}{2\pi}\right).$$

5. The lightwave interference measurement apparatus according to claim 1,
   wherein the wavelength-variable laser has a first time period in which the wavelength is stabilized to the first reference wavelength $\lambda_1$ and a second time period in which the wavelength is stabilized to the second reference wavelength $\lambda_2$.

6. The lightwave interference measurement apparatus according to claim 1,
   wherein the wavelength reference element is an etalon.

7. The lightwave interference measurement apparatus according to claim 1,
   wherein the wavelength reference element is a frequency-stabilized light source, and
   wherein the wavelength-variable laser is configured so that a frequency offset lock is performed with reference to the frequency-stabilized light source.

8. A measurement method using a lightwave interference measurement apparatus, the apparatus comprising:

a wavelength-variable laser configured to periodically perform wavelength scanning between a first reference wavelength $\lambda_1$ and a second reference wavelength $\lambda_2$ to emit light beam;

a wavelength-fixed laser configured to emit light beam having a third reference wavelength $\lambda_3$;

a wavelength reference element configured to be able to set a wavelength of the light beam emitted from the wavelength-variable laser to the first reference wavelength $\lambda_1$ and the second reference wavelength $\lambda_2$;

a light beam splitting element configured to split the light beams emitted from the wavelength-variable laser and the wavelength-fixed laser into reference light beam and light beam under test; and a phase detector configured to detect a phase based on an interference signal of the reference light beam that is reflected on a reference surface and the light beam under test that is reflected on a surface under test;

the method comprising the steps of:

sequentially determining an interference order of the third reference wavelength $\lambda_3$ based on the third reference wavelength $\lambda_3$, a first synthetic wavelength $\Lambda_{12}$, a second synthetic wavelength $\Lambda_{13}$, an integer component of a phase change amount in the wavelength scanning, and interference orders of the first synthetic wavelength $\Lambda_{12}$ and the second synthetic wavelength $\Lambda_{13}$, and calculating an absolute distance between the surface under test and the reference surface using the determined interference order of the third reference wavelength $\lambda_3$, where the first synthetic wavelength $\Lambda_{12}$ is represented by $\lambda_1 \cdot \lambda_2 / |\lambda_1 - \lambda_2|$ and the second synthetic wavelength $\Lambda_{13}$ is represented by $\lambda_1 \cdot \lambda_3 / |\lambda_1 - \lambda_3|$.

* * * * *